United States Patent [19]

Huang

[11] Patent Number: 5,702,498
[45] Date of Patent: Dec. 30, 1997

[54] PROCESS FOR CARBON-COATING SILICATE GLASS FIBERS

[75] Inventor: Jianzhong Huang, Westerville, Ohio

[73] Assignee: Owens-Corning Fiberglas Technology, Inc., Summit, Ill.

[21] Appl. No.: 513,197

[22] Filed: Aug. 9, 1995

[51] Int. Cl.$^6$ .................................................. C03B 37/02
[52] U.S. Cl. ........................... 65/453; 65/443; 65/475; 65/481; 65/60.6; 427/226; 427/249
[58] Field of Search .............................. 65/443, 481, 444, 65/475, 529, 530, 385, 401, 406, 408, 409, 411, 425, 453, 60.6, 405, 430; 427/226, 228, 249; 501/37

[56] References Cited

U.S. PATENT DOCUMENTS

| | | |
|---|---|---|
| 3,076,324 | 2/1963 | Morgan . |
| 3,742,101 | 6/1973 | Ouchi et al. . |
| 3,989,494 | 11/1976 | Veazie . |
| 4,735,856 | 4/1988 | Schultz et al. ........... 427/249 X |
| 5,152,817 | 10/1992 | Bennett et al. . |
| 5,256,177 | 10/1993 | Bennett et al. . |
| 5,281,247 | 1/1994 | Aikawa et al. . |
| 5,348,564 | 9/1994 | Aikawa et al. . |
| 5,352,261 | 10/1994 | Aikawa et al. . |
| 5,354,348 | 10/1994 | Zushi et al. . |

FOREIGN PATENT DOCUMENTS

| | | | |
|---|---|---|---|
| 26 30 978 | 1/1978 | Germany | 65/405 |
| 2 105 371 | 3/1983 | United Kingdom | 65/405 |

OTHER PUBLICATIONS

Jul. 8, 1991, "Inviscid Melt Spinning Of Alumina Fibers: Chemical Jet Stabilization" by Frederick T. Wallenberger, Norman E. Weston, Ketil Motzfeldt & Dennis G. Swarzfager pp. 629–636, Journal of the American Ceramic Society, vol. 75, No. 3.

Dec. 12, 1966, "A Strong Carbon–Coated Silica Fibre" by G.A. Cooper, pp. 206–210, Journal of Materials Science 2 (1967).

*Primary Examiner*—Curtis Mayes
*Attorney, Agent, or Firm*—C. Michael Gegenheimer; Inger H. Eckert

[57] ABSTRACT

This invention is a strand of silicate glass fibers with a carbon skin or sheath around each glass fiber of the strand. The invention uses hydrocarbon pyrolysis with silicate fiber glass manufacturing to produce fibers using conventional melt-bushing technology. The formation of a carbon skin or sheath on the silicate glass fibers offers numerous advantages. For example, pyrolyzing hydrocarbons is endothermic. Heat is removed in the process and fibers are cooled faster. This helps to achieve higher throughput.

3 Claims, 1 Drawing Sheet

PROCESS FOR CARBON-COATING SILICATE GLASS FIBERS

TECHNICAL FIELD

This invention relates to strands of carbon coated glass fibers and to a process for producing these fibers. More specifically, this invention relates to reinforcement or textile glass fibers.

BACKGROUND OF THE INVENTION

The standard glass composition for making continuous glass fiber strands is "E" glass which dates back to the 1940's. Despite the passing of 50 years, E glass still is the most common glass for making textile and reinforcement glass fibers. See U.S. Pat. No. 2,334,961. The key advantage of E glass is that its liquidus temperature is 200° F. below its forming temperature, the temperature at which the viscosity of the glass is customarily near 1000 poise. E glass melts and refines at relatively low temperatures, all of which makes these reinforcements and textiles easy to make.

Glass fiber packages are commonly manufactured by discharging a plurality of molten glass streams from a heated bushing, attenuating the plurality of glass streams into a plurality of fibers, passing the fibers through an applicator to apply an aqueous based size to the fibers. After this, the fibers are gathered into a strand at a gathering shoe and are then wound on a collet to produce a glass fiber package. This package is then dried to evaporate the water from the aqueous based size.

Both manufacturers and users are aware of the advantages and disadvantages of the aqueous based sizes. Migration, discoloration, disposal and the like are just some of the problems dealt to one who makes or uses these packages.

DISCLOSURE OF INVENTION

I have invented silicate glass fibers with a carbon skin or sheath which provides improved fatigue resistance (stress corrosion resistance), improved strength, higher C.E. (conversion efficiency), lower break rates during forming, higher throughputs, better interface for interfacial bonding in composites, improved alkali resistance, better abrasion resistance and easy handling.

I use hydrocarbon pyrolysis with silicate fiber glass manufacturing to produce fibers using conventional melt-bushing technology. The formation of a carbon skin or sheath on the silicate glass fibers offers numerous advantages. For example, a strong hermetical seal by the carbon skin prevents moisture attack, thereby minimizing the extent of stress corrosion (improved fatigue resistance) and improves fiber strength. Moisture is responsible for lowering the fiber strength by as much as 60%. Formation of carbon skin passivates the fiber surface (defeats water molecules in the race towards absorption on fiber surfaces). It also hinders moisture diffusion onto the fiber surface during down-stream process and use. The carbon sheath also provides a better interface for composite reinforcement. It yields better abrasion resistance and easy handling; and it provides a better surface for applications requiring alkali resistance (concrete reinforcement). This also eliminates the need for water spray and size application, and simplifies the manufacturing process for commercial silicate glass fibers.

One benefit of this is the ability to run fiberizing bushings at much higher temperatures. This leads to higher throughout and better C.E. (conversion efficiency) because of minimization of devitrifications and unmelted batch stones, and better melt quality (homogenization) at higher temperatures. Pyrolyzing hydrocarbons is endothermic. Heat is removed in the process and the fibers are cooled faster. This helps to achieve higher throughput. Better fiber strength will reduce break rates during fiber forming. This yields a higher C.E. (conversion efficiency).

BEST MODE FOR CARRYING OUT INVENTION

Figure 1:
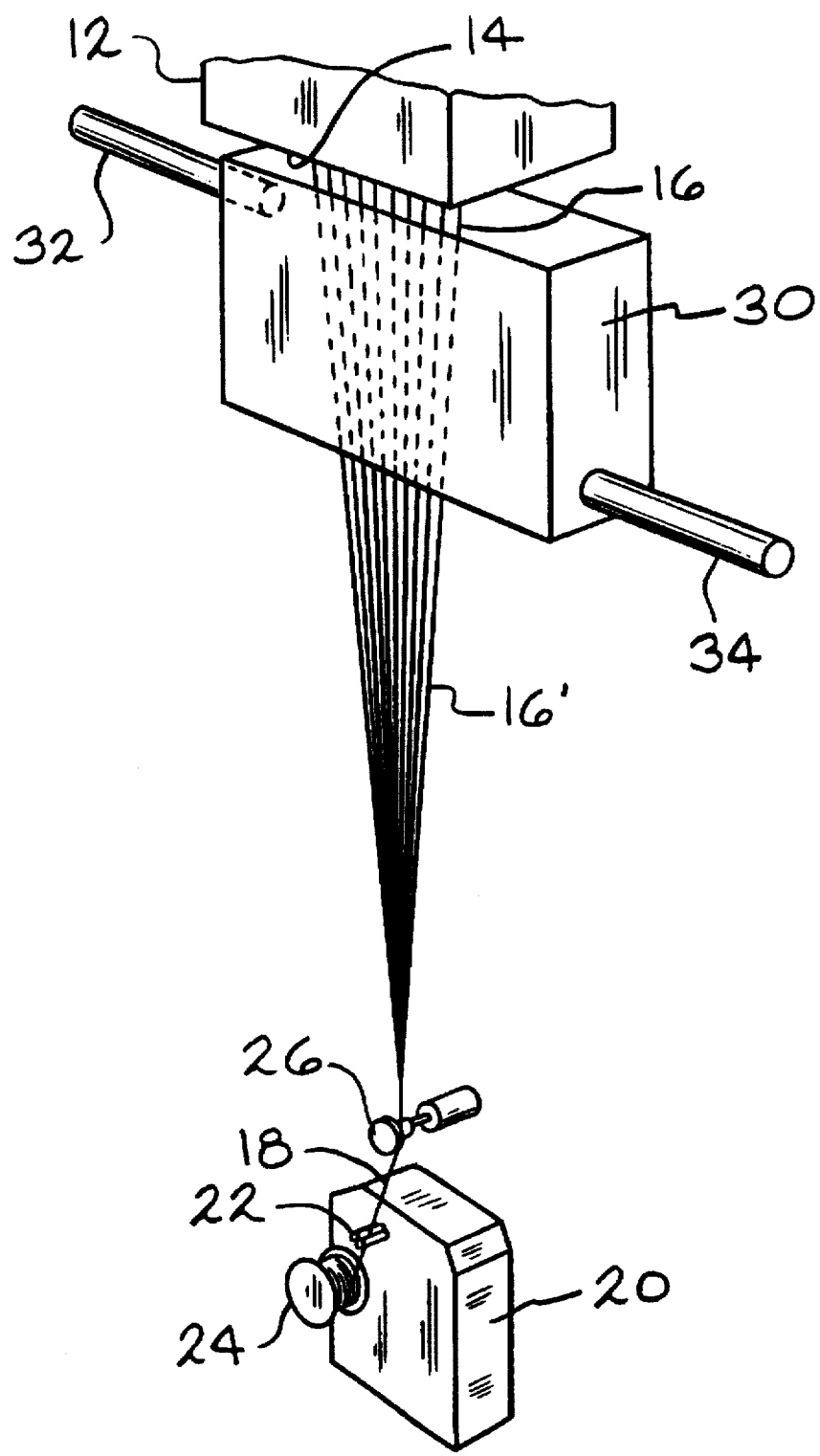
FIG. 1 is a view, partially broken away, exemplifying an apparatus as contemplated for use in practicing the present invention.

FIG. 1 shows a bushing 12 from whose bottom plate 14 molten glass is discharged. The glass is discharged as a plurality of molten glass streams having a temperature ranging from 700° C. to 2000° C. The glass forms into a plurality of fibers 16. Bottom plate 14 of bushing 12 may be "tipless" or it may include the more conventional fiber forming tips (not shown). Additionally, it will be realized that when tips are employed, bushing 12, adjacent to its bottom 14 will also include conventional fin-shields (not shown) for cooling the glass emitted from the bushing bottom. Significantly, it will be observed that no conventional prepad sprays or size applicator are illustrated in the drawings. The practice of the present invention eliminates an aqueous size which in turn eliminates prepad sprays and size applicators.

In accordance with conventional practice, a winder 20 attenuates the glass emanating from the bushing bottom 14 to form fibers 16. The fibers 16 are gathered into a bundle or strand 18. This strand with the assistance of a traversing mechanism 22 is wound on a collet 24 to produce a final fiber package. Any conventional gathering shoe 26 may be employed to gather the fan of fibers into a strand.

The hydrocarbon gas can be either methane ($CH_4$), butane ($C_2H_6$) or propane ($C_3H_8$). The hydrocarbon gas should be delivered with or without an inert gas (e.g., At, He, $N_2$). The hydrocarbon gas should be delivered within 10 cm from bushing tip down in order to form hermetic carbon skin (fiber surface temperature is sufficiently high to pyrolyze hydrocarbon gas, and the minimum temperature is about 1000° F.) without electric arc to assist the hydrocarbon pyrolysis reaction. With electric-arc, the hydrocarbon gas may be introduced onto fiber surface below forming tip even further, but it should be dose to the forming tip so that carbon skin can be formed before moisture absorption onto fiber surface. The gas delivery system may be incorporated into the existing finished, and a weak vacuum system can be used to collect the exhaust gas.

As fibers 16 are drawn through tube or chamber 30, carbon-coat forming gas is flowed into the tube and onto the fibers where it reacts to form a carbon coating on the fibers. The gas and reaction products are flowed in the direction of movement of the fibers and out of an end of the chamber. The gas continues to react as it flows through the chamber and after it exits the chamber.

The gas extracts heat from fibers 16 as they move through chamber 30. More specifically, the gas introduction region defines the top of chamber 30, fibers 16 being hottest in that region. The gas reacts immediately upon contacting the fibers. Unreacted gas and spent gases flow downwardly along with fibers 16 through chambers 30, the reaction continuing as the gases flow down.

Some of the reaction products that form near the fiber surface continue to flow radially away from the fiber as they flow downwardly. Chamber 30 must be sufficiently long to confine the reactions near the fibers for a sufficient axial length as an adequate coating thickness is formed.

Entrance tube 32 provides the carbon-coat forming gases to chamber 30 and exit tube 34 removes the gases. Obviously some gas will exit the bottom of chamber 30 with coated fibers 16.

Preferred conventional glass compositions are calcia, aluminoborosilicates such as "E" glass commonly used for making textile and reinforcement glass fibers. See U.S. Pat. No. 2,334,961. Other embodiments include "S" glass compositions as U.S. Pat. No. 3,402,055 disclose. I can also use boron and fluorine free reinforcement glass fibers. See U.S. Pat. No. 4,026,715.

A typical E glass composition is:

| Ingredients | Weight Percent |
| --- | --- |
| $SiO_2$ | 52–56 |
| $Al_2O_3$ | 12–16 |
| CaO | 16–25 |
| MgO | 0–6 |
| $B_2O_3$ | 5–13 |
| $Na_2O + K_2O$ | 0–1 |
| $F_2$ | <0.75 |
| $Fe_2O_3$ | <0.75 |
| $TiO_2$ | <0.75 |
| SrO | <0.75 |
| $Li_2O$ | <0.75 |
| Viscosity Temperature (°F.) at Log Poise 3.0 | 2264 |
| Liquidus Temperature (°F.) | 2145 |

EXAMPLE

More specifically, the E glass fibers can be:

| Ingredients | Weight Percent |
| --- | --- |
| $SiO_2$ | 54.5 |
| $Al_2O_3$ | 14.5 |
| CaO | 15.9 |
| MgO | 4.4 |
| $B_2O_3$ | 10.0 |
| $Na_2O$ | 0.5 |
| $F_2$ | 0.3 |
| $Fe_2O_3$ | 0.4 |

This process provides several advantages to a silicate glass fiber forming process. Application of a carbon skin or sheath on the surface of the glass fiber provides several advantages to silicate glass fiber formation over prior art glass fiber forming processes. The pyrolysis reaction of the hydrocarbon glass in the heated glass fiber provides a endothermic reaction. Thus, heat is drawn away from the surface of the glass fiber due to the reaction. This allows for an accelerated cooling of the glass fiber. A quicker rate of cooling for the glass fiber provides several advantages. First, quicker cooling allows higher throughput of fibers through the system. Second, a quicker rate of cooling allows higher formation temperatures within the bushing to be employed. Higher formation temperatures allows for a more thorough melting of the components within the bushing. Therefore, a more homogeneous melt is achieved and a stronger and superior silicate glass fiber is produced. In addition, the presence of the carbon skin minimizes the extent of stress corrosion and improves the overall fiber strength. Also, the carbon skin on the fiber surface may provide a better interface for composite reinforcement.

The thinner fibers that make up reinforcements have different concerns from thicker optical fibers. In reinforcement glass fibers, major concerns include the throughput speed of the fibers and the homogeneity of the glass composition.

Reinforcements focus on a method or system for producing glass fibers wherein a multiplicity of fibers are drawn from a bushing tip at the same time, at higher throughput speeds. The increase in the rate of heat removal due to the endothermic reaction and the increase in forming temperatures in the bushing for a more homogeneous blend of the glass composition, disclosed in this invention, are very important and desirable for commercial silicate glass fiber manufacturing.

What is claimed is:

1. A method for producing reinforcement or textile glass fibers comprising:

discharging a plurality of molten silicate glass streams from a bushing;

contacting the plurality of molten glass streams with a hydrocarbon gas near the bushing;

thermally decomposing hydrocarbon gas using only heat contained in the plurality of molten glass streams; wherein the plurality of molten glass streams has a temperature ranging from 700° C. to 2000° C.;

wherein the thermal decomposing cools the plurality of molten glass streams to a plurality of continuous glass fibers and coats each glass fiber with a carbon coating;

simultaneously with the thermal decomposing, attenuating the plurality of molten glass streams into the plurality of continuous glass fibers; and gathering the plurality of continuous glass fibers into a strand.

2. The method of claim 1, wherein the silicate glass is an E glass having a composition comprising 52 to 56 weight percent $SiO_2$, 12 to 16 weight percent $Al_2O_3$, 16 to 25 weight percent CaO, 0 to 6 weight percent MgO, 5 to 13 weight percent $B_2O_3$, 0 to 1 weight percent $Na_2O+K_2O$, less than 0.75 weight percent $F_2$, less than 0.75 weight percent $Fe_2O_3$, less than 0.75 weight percent $TiO_2$, less than 0.75 weight percent SrO, and less than 0.75 weight percent $Li_2O$.

3. The method of claim 1, wherein the silicate glass is an S glass.

* * * * *